UNITED STATES PATENT OFFICE.

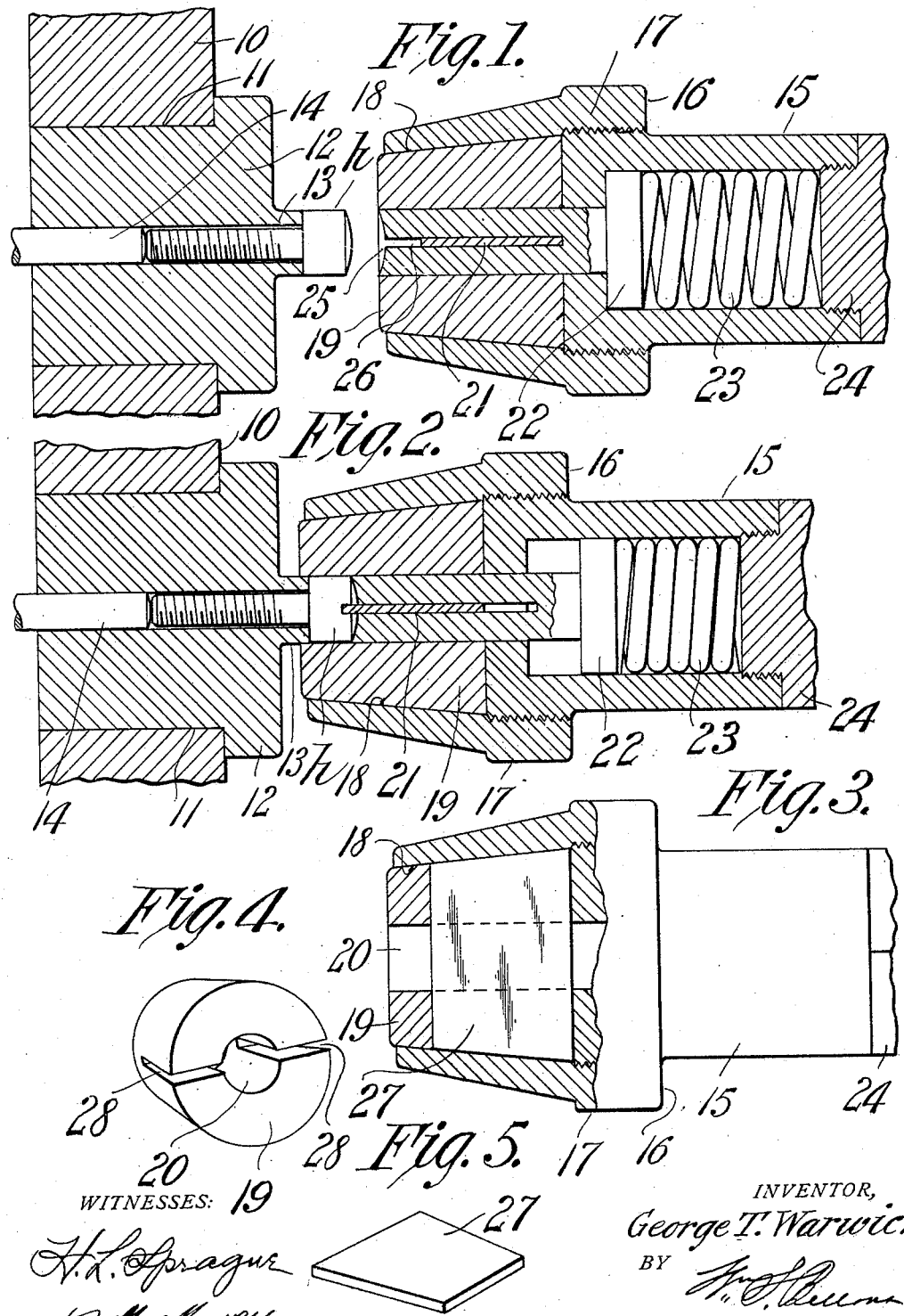

GEORGE T. WARWICK, OF SPRINGFIELD, MASSACHUSETTS.

SCREW-HEAD SHAPING AND SLOTTING DEVICE.

976,758.

Specification of Letters Patent.   Patented Nov. 22, 1910.

Application filed January 22, 1909.   Serial No. 473,675.

To all whom it may concern:

Be it known that I, GEORGE T. WARWICK, a citizen of the United States of America, and resident of Springfield, in the county of Hampden and State of Massachusetts, have invented certain new and useful Improvements in Screw-Head Shaping and Slotting Devices, of which the following is a full, clear, and exact description.

This invention relates to mechanism for shaping the heads of screws or bolts, and it has for one of its objects the provision of a device whereby such heads are swaged to form them of uniform size and to provide in each blank a slot adapted to receive a screw driver or similar implement.

My invention has, furthermore, for its object the combination with a head-sizing device of a slotting blade carried thereby and adapted to enter the stock of the head to form the slot.

Further objects of the invention will hereinafter appear and the means for their attainment particularly pointed out in the claims.

To attain the desired objects, my invention, broadly stated, consists of a stationary part or member carrying the screw and a movable member adapted to completely receive and inclose the head of the screw, and when in such inclosed position to form the slot in said head of the screw without spreading the material forming the head of the screw.

The invention further consists of means for completing the head of the screw and forming the slot therein consisting of means for inclosing the head and simultaneously forming the slot therein, and in the novel construction and combination of parts substantially as disclosed herein.

My invention has been clearly illustrated in the accompanying drawings in which similar characters denote similar parts, and in which—

Figure 1 represents a central longitudinal section through the coöperative parts of the device preparatory to their operation upon a screw. Fig. 2 is a similar view illustrating the action of the device in shaping and slotting the head of said screw. Fig. 3 is a side view of the slotting tool-holder partly broken away to disclose the slotting blade and the manner of securing the same in place therein. Fig. 4 is a perspective view of the blade-holder proper and Fig. 5 is a perspective view of the slotting blade.

In the drawings, 10 denotes a stationary head constituting a portion of a machine which may be of any desired construction, which head is provided with an aperture 11 to receive a work support 12 which may be replaced by another one of different size and which is bored out to receive the work or blank to be operated upon. The device is in the present instance adapted to shape and slot the heads of what are generally known as fillister head screws, and the holder 12 is provided at its forward end with a cylindrical hub 13 of such size as to correspond with the diameter of the head of the screw to be operated upon. An abutment plunger 14 may be employed to rest against the end of the screw or blank so as to offer a resistance at that point.

The tool-holder containing the slotting blade is preferably movable and comprises a sleeve 15 which is screw threaded at its forward end as at 16 to receive a cap 17 which is preferably tapered at its inner surface 18 to correspond with the taper of a sizing-head 19 resting with its rear face against the front face of the sleeve 15 above mentioned.

By referring to Fig. 4, it will be seen that the sizing-head is provided with a longitudinal opening 20 of such size as to fit the head of the screw to be operated upon and also the diameter of the hub 13 above referred to; while a plunger 21 is mounted for longitudinal movement in both the sizing-head and the sleeve 15, the plunger 21 being provided with a head 22 to receive one end of a stiff spring 23, the other end of which rests against a plate 24 so as to provide for yielding movement on part of the plunger or as it may be called "forming-tool" 21.

The forward end of the forming-tool 21 is slightly dished, as shown in 25, to correspond with the crown head of the screw blank, and said plunger is slotted as at 26 to straddle the slotting blade 27, the opposite ends of which rest in side slots 28 of the sizing-head 19.

From the above description it will be noted that the cap 17 serves to draw the several pieces, viz, the sizing-head 19, blade 27, and the sleeve 15 tightly together.

When the movable tool-holder in its entirety is forced toward the left in Fig. 1 the head h of the blank will enter the central aperture 20 of the sizing-head 19 and gradually push the plunger 21 inward against the resistance of the spring 23 until the crown portion of said head comes in contact with the front edge of the blade 27, whereupon by the continued movement of said tool-holder, said blade will be forced into said head to form a slot, the metal displaced thereby naturally tending to either elongate the head proportionately or to solidify and condense the head proportionately without, however, changing the crown top face which will be maintained by virtue of the crown recess 25, above mentioned.

As the tool-holder is now withdrawn from the work-holder, and as the head h will now naturally fill the central bore 20, the frictional contact between the screw head and the sizing-head will tend to withdraw the screw from its holder 12. However, this action is prevented by the spring 23 which is sufficiently strong to move the plunger 21 outward during the retrograde movement of the tool-holder so that the plunger 21 will then act as an ejector to relieve the sizing-head from the screw blank.

I claim:

1. The combination, with a work-holder, of a tool-holder, one of said parts being movable relatively to the other, said tool-holder comprising a sizing-head adapted to engage and confine the work to be operated upon, a tool fixed in said tool-holder and adapted to enter upon the work in the tool-holder, and an ejector plunger for releasing the work from the holder.

2. The combination, with a work-holder, of a tool-holder, one of said parts being movable relatively to the other, said tool-holder comprising a sizing-head adapted to engage and confine the work to be operated upon, a tool fixed in said tool-holder and adapted to enter upon the work in the tool-holder, an ejector plunger for releasing the work from the holder, and yielding means for actuating said plunger.

3. The combination, with a work-holder, of a tool-holder, one of said parts being movable relatively to the other, said tool-holder comprising a sizing-head adapted to engage and confine the work to be operated upon, a tool fixed in said tool-holder and adapted to enter upon the work in the tool-holder, an ejector plunger for releasing the work from the holder, means for guiding said plunger in the sizing-head, and a spring for actuating the same to release the work from the sizing-head.

4. The combination, with a work-holder, of a tool-holder, one of said parts being movable relatively to the other, said tool-holder comprising a sizing-head adapted to engage and confine the work to be operated upon, a chambered sleeve having a centrally disposed aperture, an ejector plunger yieldingly mounted in said sleeve and sizing-head, a slotting blade carried by said sizing-head, and means for securing said blade, sizing-head and sleeve together.

5. In screw head shaping and slotting devices, the combination of a stationary member adapted to receive and support a screw, of a movable member having a head constructed to entirely receive and completely inclose the head of the screw, and means in the movable member for forming a slot in said head and finishing the head.

6. In screw head shaping and slotting devices, the combination of a stationary member adapted to receive the body of the screw and provided with a support corresponding in size and shape to the head of the screw, and a movable member provided with means to snugly receive and inclose the screw head, and provided with a blade for forming the slot in the screw head.

7. In screw head shaping and slotting devices, the combination of a stationary member constructed to receive the body of the screw and support the head thereon, an abutment in said member for retaining the body of the screw in proper relation, a movable member having a sizing head shaped to receive and entirely surround and inclose the head of the screw, a blade in the shaping head for forming the slot in the head of the screw and a yielding plunger in the sizing head for receiving the impact of the head of the screw.

8. In a screw head shaping and slotting device, the combination of a pair of members adapted to have movements the one relatively to the other, and one of said members constructed with a screw shank socket and provided with a forwardly projecting cylindrical hub-like abutment with the end of which the base of the screw head engages, and the other member having a sizing head provided with an endwise opening cylindrical pocket for receiving therewithin and entirely inclosing the head of the screw and into which said cylindrical abutment may follow, a transverse blade in the sizing head for forming a slot in the head of the screw and a yieldable plunger in the sizing head for receiving the impact of the head of the screw.

Signed by me at Springfield, Mass., in presence of two subscribing witnesses.

GEORGE T. WARWICK.

Witnesses:
G. R. DRISCOLL,
WM. F. BELLOWS.